(12) United States Patent
Borton et al.

(10) Patent No.: US 12,140,576 B2
(45) Date of Patent: Nov. 12, 2024

(54) MULTI-DIMENSIONAL CHROMATOGRAPHY MODULATOR WITH VARIABLE MODULATION PERIOD

(71) Applicant: LECO Corporation, St. Joseph, MI (US)

(72) Inventors: David Jesse Borton, St. Joseph, MI (US); Jonelle Ley Shiel, Stevensville, MI (US); Mark Firmer Merrick, Bridgman, MI (US)

(73) Assignee: LECO Corporation, St. Joseph, MI (US)

( * ) Notice: Subject to any disclaimer, the term of this patent is extended or adjusted under 35 U.S.C. 154(b) by 0 days.

(21) Appl. No.: 18/602,959

(22) Filed: Mar. 12, 2024

(65) Prior Publication Data

US 2024/0219357 A1 Jul. 4, 2024

Related U.S. Application Data

(63) Continuation of application No. 17/423,090, filed as application No. PCT/US2020/013989 on Jan. 17, 2020, now abandoned.

(60) Provisional application No. 62/793,509, filed on Jan. 17, 2019.

(51) Int. Cl.
*G01N 30/46* (2006.01)
*G01N 30/16* (2006.01)
*G01N 30/88* (2006.01)
*G01N 30/02* (2006.01)

(52) U.S. Cl.
CPC .......... *G01N 30/463* (2013.01); *G01N 30/16* (2013.01); *G01N 30/88* (2013.01); *G01N 2030/025* (2013.01)

(58) Field of Classification Search
CPC ...... G01N 30/463; G01N 30/16; G01N 30/88; G01N 2030/025
See application file for complete search history.

(56) References Cited

U.S. PATENT DOCUMENTS

| | | | |
|---|---|---|---|
| 9,341,604 B2* | 5/2016 | Fan | G01N 30/46 |
| 9,696,285 B2* | 7/2017 | Duraffourg | G01N 30/7206 |
| 10,352,913 B2* | 7/2019 | Hirooka | G01N 30/463 |
| 10,768,150 B2* | 9/2020 | Fan | G01N 30/463 |

(Continued)

OTHER PUBLICATIONS

LECO Corporation. "Light Crude Oil Fingerprinting from Six Different Global Regions Using GCxGC-TOFMS with Structural Classifications to Compare Functional Group Differences" dated Jan. 13, 2023, p. 1. From www.leco.com. Form No. 203-821-434.

(Continued)

*Primary Examiner* — Freddie Kirkland, III
(74) *Attorney, Agent, or Firm* — Honigman LLP

(57) ABSTRACT

A multi-dimensional gas chromatograph for analyzing compounds in a sample during a single run is disclosed. The multi-dimensional gas chromatograph includes a first column, a second column, and a modulator disposed between the first column and the second column. The modulator modulates at (i) a first modulation period over a first time period during the run and (ii) a second modulation period over a second time period during the run later than the first time, the second modulation period being different than the first modulation period.

20 Claims, 2 Drawing Sheets

(56) References Cited

U.S. PATENT DOCUMENTS

2022/0082535 A1* 3/2022 Borton ................. G01N 30/463

OTHER PUBLICATIONS

LECO Corporation. "ChromaTOF Brand Software Instruction Manual". Version 5.3x, Part No. 200-999-025, dated Apr. 2018, p. 24-16. Found on www.leco.com. ISO-9001:2008 HQ-Q-994.

* cited by examiner

MULTI-DIMENSIONAL CHROMATOGRAPHY MODULATOR WITH VARIABLE MODULATION PERIOD

CROSS REFERENCE TO RELATED APPLICATIONS

This application is a continuation of U.S. application Ser. No. 17/423,090 filed on Jul. 14, 2021, which claims priority to a 371 National Stage entry based on International Application No. PCT/US2020/013989 filed on Jan. 17, 2020, which claims priority to U.S. Provisional Application No. 62/793,509, filed on Jan. 17, 2019, the disclosure of which is considered part of the disclosure of this application and is hereby incorporated by reference in its entirety.

TECHNICAL FIELD

This disclosure relates to the field of gas chromatography, including Comprehensive Multi-Dimensional Gas Chromatography (GC×GC), Comprehensive Multi-Dimensional Gas Chromatography—High Resolution Mass Spectrometry (GC×GC-HRMS), Comprehensive Multi-Dimensional Gas Chromatography—Time-of-Flight Mass Spectrometry (GC×GC-ToF-MS), and the like.

BACKGROUND

Gas chromatography is conventionally used to separate and analyze compounds in a variety of applications and across a number of disciplines. Traditional gas chromatography may involve the combination of a sample, or mixture of analytes, to be tested with a carrier gas (e.g., helium or hydrogen) within a column to form an effluent. As the effluent moves through the column, various analytes may be separated from one another due to a variety of factors, such as, for example, flow characteristics, mass of the analyte, etc. Upon exiting the column, the separated analytes may be detected and analyzed.

When two or more analytes of a sample have similar characteristics, it may be difficult to separate such analytes because they may tend to move at similar velocities through the column such that a sufficient amount of separation does not occur. To address the foregoing and improve the resolution of the analysis, rather than using a single column, a technique has been implemented whereby at least portions of the effluent are periodically injected into a second column, whereby the second column may possess one or more different characteristics than the first column, and the effluent is detected by a detector at the end of the second column. This is generally known as comprehensive two-dimensional (or multi-dimensional) gas chromatography (GC×GC).

In a comprehensive two-dimensional gas chromatography system, the first column and the second column may be coupled to one another by a modulator. The modulator may be capable of modulating the effluent many times for the duration of an analysis. The modulation period may be defined as the time it takes for the modulator to sample and inject the effluent from the first column into the second column. The modulator may repeat the modulation period during the entirety of a run or analysis of the GC×GC system, hundreds or even thousands of time.

The modulation rate of a GC×GC system, for example, a low duty cycle GC×GC system, may influence the collection and analysis of qualitative and quantitative information about the analyte. For example, a modulation period that is too long may result in analytes being insufficiently sampled from the first column and peaks or analytes may be lost or undetected by the modulator. Conversely, a modulation period that is too short may result in an issue referred to as "wrap-around." Wrap-around may occur when peaks from a modulation period are retained for so long in the second column that they elute in a subsequent modulation period where they may coelute with peaks from the subsequent modulation, resulting in degradation of the quality of the chromatographic separation and ability to identify analytes. Accordingly, there may be an optimal modulation period based on the width of the peak eluting from the first column. The optimal modulation period may provide a sufficient number of modulations across the width of the peak eluting from the first column to provide quantitative results for low duty cycle modulators and little reduction in first dimension chromatographic resolution for all modulators, but not an excessive number of short duration modulations which may result in wrap-around.

Additionally, the optimal modulation period may change over the course of a GC×GC run as early-eluting peaks may have narrower peaks than later-eluting peaks. This may be particularly evident toward the end of a GC×GC run if an isothermal hold is used at the end of the run due to temperature limitations of the columns. Accordingly, it may be desirable for GC×GC systems to account for changing optimal modulation periods over the course of a GC×GC run.

SUMMARY

One aspect of the disclosure provides a two-dimensional gas chromatograph for analyzing compounds in a sample during a single run. The two-dimensional gas chromatograph includes a first column, a second column, and a modulator disposed between the first column and the second column. The modulator modulates at (i) a first modulation period over a first time period during the run and (ii) a second modulation period over a second time period during the run later than the first time period, the second modulation period being different than the first modulation period.

Implementations of the disclosure may include one or more of the following features. In some implementations, the second modulation period may be longer than the first modulation period. The modulator may be operating at a low duty cycle.

At least one of the first modulation period or the second modulation period may be configured to provide a sufficient number of modulations across a width of a peak eluting from the first column to provide quantitative results and little reduction in first dimension chromatographic resolution for the modulator. The sufficient number of modulations may be configured to avoid wrap-around on a chromatogram.

The two-dimensional gas chromatograph may include an injector configured to inject a sample into the first column. The modulator may be configured to sample the sample and inject the sample into the second column. The two-dimensional gas chromatograph may include a detector configured to receive and detect the sample.

Another aspect of the disclosure provides a method for detecting compounds in a sample during a single run using a two-dimensional gas chromatograph having an injector, a first column, a second column and a modulator disposed between the first column and the second column. The method includes injecting a sample into the first column, passing a first portion of the sample into the modulator, and modulating, by the modulator, the first portion of the sample at a first modulation period over a first period of time.

Modulating at the first modulation period over the first period of time includes sampling the first portion of the sample and injecting the first portion of the sample into the second column. The method includes detecting the first portion of the sample at a detector. The method includes passing a second portion of the sample into the modulator, and modulating, by the modulator, the second portion of the sample at a second modulation period different than the first modulation period over a second period of time. Modulating at the second modulation period over the second period of time includes sampling the second portion of the sample and injecting the second portion of the sample into the second column. The method includes detecting the second portion of the sample at the detector.

Implementations of the disclosure may include one or more of the following features. In some implementations, the second modulation period may be longer than the first modulation period. The modulator may be operating at a low duty cycle.

At least one of the first modulation period or the second modulation period may be configured to provide a sufficient number of modulations across a width of a peak eluting from the first column to provide quantitative results and little reduction in first dimension chromatographic resolution for the modulator. The sufficient number of modulations may be configured to avoid wrap-around on a chromatogram.

Sampling the first portion of the sample and injecting the first portion of the sample into the second column may occur multiple times over the first period of time. Sampling the second portion of the sample and injecting the second portion of the sample into the second column may occur multiple times over the second period of time.

Another aspect of the disclosure provides a modulator for a two-dimensional gas chromatograph for analyzing compounds in a sample during a single run. The modulator is configured to perform a method comprising modulating a first portion of a sample from a first column at a first modulation period over a first period of time. Modulating at the first modulation period over the first period of time includes sampling the first portion of the sample and injecting the first portion of the sample into a second column. The modulator is configured to modulate a second portion of the sample from the first column at a second modulation period over a second period of time. Modulating at the second modulation period over the second period of time includes sampling the second portion of the sample and injecting the second portion of the sample into the second column.

Implementations of the disclosure may include one or more of the following features. In some implementations, the modulator may be disposed between the first column and the second column of the two-dimensional gas chromatograph.

The second modulation period may be longer than the first modulation period.

The modulator may be operating at a low duty cycle.

At least one of the first modulation period or the second modulation period may be configured to provide a sufficient number of modulations across a width of a peak eluting from the first column to provide quantitative results and little reduction in first dimension chromatographic resolution for the modulator, and the sufficient number of modulations may be configured to avoid wrap-around on a chromatogram.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

The following description of the various embodiments is merely exemplary in nature and is in no way intended to limit the invention, its application or uses. For brevity, the disclosure hereof will illustrate and describe a two-dimensional gas chromatography system in various exemplary embodiments. Based on the foregoing, it is to be generally understood that the nomenclature used herein is simply for convenience and the terms used to describe the invention should be given the broadest meaning by one of ordinary skill in the art.

Figure 1:
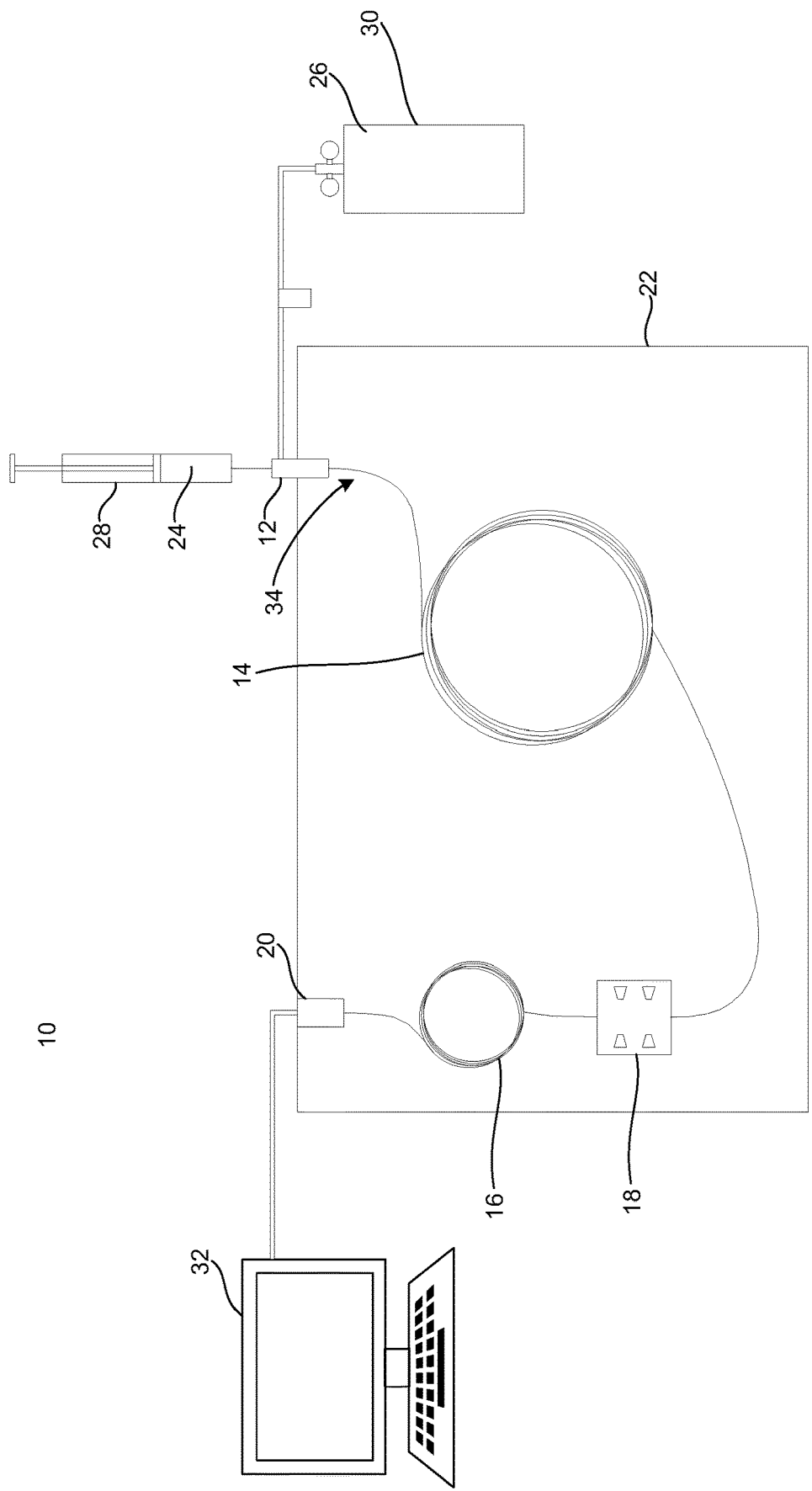
FIG. 1 is a schematic view of an exemplary comprehensive two-dimensional gas chromatography (GC×GC) system.

With reference to the figures, where like reference symbols indicate like elements, a comprehensive two-dimensional gas chromatography (GC×GC) system 10 is generally shown schematically at FIG. 1. The GC×GC system 10 includes an injector 12, a first column (or capillary) 14, a second column (or capillary) 16, a modulator 18, and a detector 20. The GC×GC system 10 includes a main oven 22, and the main oven 22 may house at least the injector 12, the first column 14, the second column 16, the modulator 18, and the detector 20.

The injector 12 may be configured to receive a sample 24 and a carrier gas 26. The sample 24 may be injected into the injector 12 via an injection device 28, such as, for example, a syringe, an automated injection device, or any other suitable means. The carrier gas 26 may be contained in a container 30, such as a tank. The sample 24 may be any suitable analyte, such as, for example, petroleum, fragrances, drug-related liquids, etc. The carrier gas 26 may be any suitable gas, such as, for example, an inert gas such as helium, an unreactive gas such as nitrogen, etc. The injector 12 may mix the sample 24 and the carrier gas 26 to form an effluent 34, and the injector 12 may inject the effluent 34 into the first column 14.

The first column 14 and the second column 16 may be wound in a generally circular configuration. The first column 14 may extend from the injector 12 to the modulator 18, and the second column 16 may extend from the modulator 18 to the detector 20. In some implementations, the first column 14 and the second column 16 may have different characteristics from each other. In one example, the first column 14 may be longer, have a greater diameter, and/or contain a different stationary phase than the second column 16. In another example, the first column 14 may be shorter and/or have a smaller diameter than the second column 16.

The modulator 18 may be configured to receive the sample 24 from the first column 14 and perform modulation on the sample 24 over a period of time referred to as a modulation period. The modulation process may include at least the steps of sampling the sample 24 and injecting the sample 24 into the second column 16. In some implementations, the modulation process includes an additional step of focusing the sample 24 prior to injecting the sample 24 into the second column 16. The modulation period is the time it takes for the modulator 18 to complete the modulation process, including the aforementioned steps.

The modulator 18 may be configured to, e.g., programmed to, have a plurality of modulation periods during a single run or analysis performed by the GC×GC system 10. For example, a single analysis performed by the GC×GC system 10 may be the time it takes for the GC×GC system 10 to analyze the entirety of the sample 24. As another example, a single analysis performed by the GC×GC system 10 may be any suitable time duration as defined by an operator of the GC×GC system 10. In some implementations, the modulator 18 modulates with a first modulation period over a first time period during the analysis, and the modulator 18 modulates with a second modulation period over a second time period during the analysis later than the first time. The second modulation period may be different than the first modulation period. For example, the second modulation period may be longer than the first modulation period. The duration of the modulation period may rely on a variety of factors, including, for example, a sufficiency of sampling the sample 24, a desire to eliminate wrap-around of signal peaks in a chromatogram, etc. In some implementations, the modulator 18 has a plurality of modulation periods during a single analysis performed by the GC×GC system 10, and the modulator 18 continuously or semi-continuously changes from one of the plurality of modulation periods to another of the plurality of modulation periods throughout the analysis, as determined by a variety of factors including, for example, sample type, temperature, duration of the analysis, etc.

The modulator 18 may be any suitable type of modulator, such as, for example, a thermal modulator, a valve-based modulator, etc. While a single modulator 18 is depicted in FIG. 1, it should be understood that any suitable number of modulators 18 may be used. The modulator 18 may be operated at any suitable duty cycle, such as, for example, a low duty cycle, a mid-range duty cycle, a high duty cycle, etc.

The detector 20 may be configured to receive the sample 24 from the second column 16. The detector 20 may detect a plurality of data about the sample 24, including, for example, retention time, signal (or intensity), etc. The detector 20 may be any suitable type of detector, such as, for example, a flame ionization detector (FID), an electron capture detector (ECD), an atomic emission detector (AED), a sulfur chemiluminescence detector (SCD), a nitrogen chemiluminescence detector (NCD), a nitrogen phosphorous detector (NPD), etc. Additionally or alternatively, a mass spectrometry system may be hyphenated to the GC×GC system 10 and used as the detector 20.

A computing device 32 may be in communication with the detector 20 and may receive data about the sample 24 from the detector 20. The computing device 32 may be any suitable device, such as, for example, a computer, a laptop, a tablet, a smartphone, etc. The computing device 32 may process the data about the sample 24 and output a chromatogram. The chromatogram may be a three-dimensional plot displaying three variables: retention time from the first column 14 (e.g., in a first dimension) along the X-axis, signal (or intensity) along the Y-axis, and retention time from the second column 16 (e.g., in a second dimension) along the Z-axis. Additionally or alternatively, the chromatogram may be a contour plot displaying retention time from the first column 14 (e.g., in the first dimension) along the X-axis, retention time from the second column 16 (e.g., in the second dimension) along the Y-axis, and contours and/or color scaling indicating signal peaks. The computing device 32 may also program the modulator 18, specifically, by instructing the modulator 18 when to switch from a first modulation period to a second modulation period.

Figure 2:
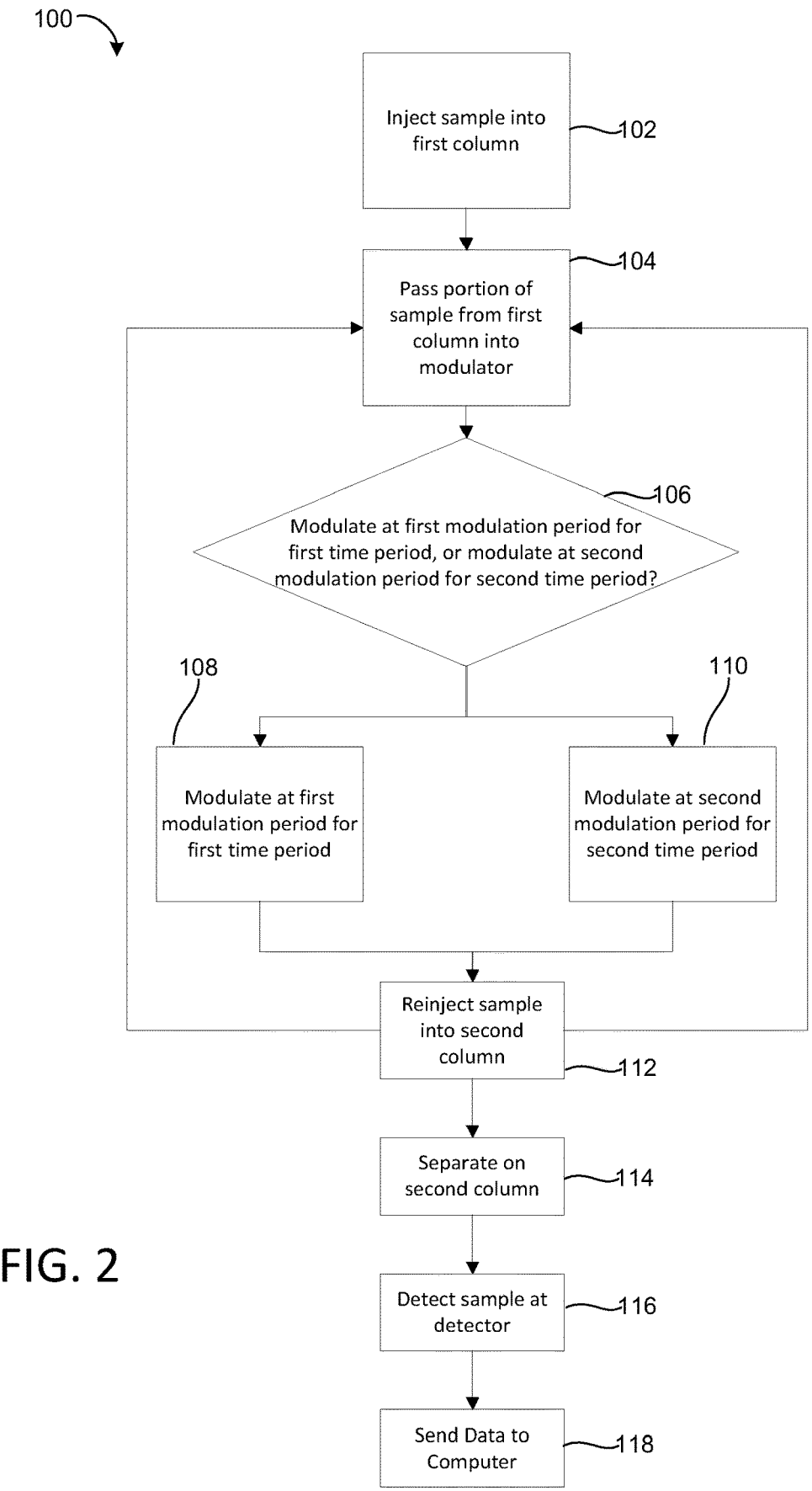
FIG. 2 is a flowchart of an exemplary method for detecting compounds in a sample during a single analysis using the GC×GC system of FIG. 1.

In view of the foregoing, a method 100 for detecting compounds in a sample during a single analysis using the exemplary GC×GC system 10, as illustrated in FIG. 2, will now be described.

First, the sample 24 is prepared and placed into a suitable form, e.g., a liquid form, a gas form, etc. Next, the sample is injected into the injector 12 where it mixes with the carrier gas 26 to form the effluent 34. As will be appreciated, the injector 12 may be a hot piece of quartz (silica) that vaporizes the sample 24, allowing it to mix with the carrier gas 26. Thereafter, the sample 24 is injected into the first column 14 at step 102, where it is then separated based on at least selectivity of the stationary phase in the first column 14. It will be appreciated that, as previously described, the effluent 34 may be a mixture including the sample 24 and the carrier gas 26. Accordingly references to the sample 24 at step 102, and hereinafter, may include the sample 24 as part of the effluent 34.

At step 104, the sample 24, i.e., a first portion of the sample 24, exits the first column 14 and passes into the modulator 18. The modulator 18 may be set at step 106 to either a first modulation period or a second modulation period. For example, if it is early in the analysis, the modulator 18 may be set to the first modulation period and if it is later in the analysis, the modulator 18 may be set to the second modulation period. While two modulation periods are described, it is to be understood that any suitable number of modulation periods may be used. For illustrative purposes, the method 100 will be described with the modulator 18 set to the first modulation period first, and then switched to the second modulation period after.

Next, the modulator 18 modulates the first portion of the sample 24 with the first modulation period at step 108. During a first time period of the analysis with the modulator 18 being set to the first modulation period, the modulator 18 samples the first portion of the sample 24 and injects the first portion of the sample 24 into the second column 16 at step 112, where it is then separated at step 114 based on at least selectivity of the stationary phase in the second column 16. Thereafter, the first portion of the sample 24 exits the second column 16 and is detected at step 116 by the detector 20. The detector 20 then sends data at step 118 about the first portion of the sample 24 to the computing device 32. This process may occur multiple times (e.g., tens, hundreds, or thousands of times) over the course of the first time period.

As soon as the modulator 18 injects the first portion of the sample 24 into the second column 16, the modulator 18 is ready to receive another portion of the sample 24. After modulating with the first modulation period at step 108 over the first time period of the analysis, the modulator 18 may be switched to the second modulation period, for example, at a later time in the analysis. The modulator 18 may receive a second portion of the sample 24 at step 104. At this point, the modulator 18 may be set at step 106 to the second modulation period, and the modulator 18 may modulate over a second time period of the analysis. During the second time period where the modulator 18 is set to the second modulation period, the modulator 18, at step 110, samples the second portion of the sample 24 and injects the second portion of the sample 24 into the second column 16 at step 112, where it is then separated at step 114 based on at least selectivity of the stationary phase in the second column 16. Thereafter, the second portion of the sample 24 exits the second column 16 and is detected at step 116 by the detector 20. The detector 20 then sends data at step 118 about the second portion of the sample 24 to the computing device 32, where a chromatogram, e.g., a three-dimensional chromatogram, is created. This process may occur multiple times (e.g., tens, hundreds, or thousands of times) over the course of the second time period.

After the sample 24 is injected into the first column 14 at step 102, steps 104-118 of the method 100 may be repeated throughout an entire analysis of the GC×GC system 10. That is, the modulator 18 may continue to modulate portions of the sample 24 received from the first column 14 and send them through the second column 16 to the detector 20 until the entirety of the sample 24 has been eluted.

A number of implementations have been described. Nevertheless, it will be understood that various modifications may be made without departing from the spirit and scope of the disclosure. Accordingly, other implementations are within the scope of the following claims.

What is claimed is:

1. A multi-dimensional gas chromatograph for analyzing compounds in a sample during a single run, the chromatograph comprising:
   a first column;
   a second column; and
   a modulator disposed between the first column and the second column, the modulator modulating with (i) a first modulation period over a first time period during the run and (ii) a second modulation period over a second time period during the run later than the first time period, the second modulation period varying over the second time period.

2. The multi-dimensional gas chromatograph of claim 1, wherein the second modulation period is longer than the first modulation period.

3. The multi-dimensional gas chromatograph of claim 1, wherein the modulator is operating at a low duty cycle.

4. The multi-dimensional gas chromatograph of claim 1, wherein at least one of the first modulation period or the second modulation period are configured to provide a sufficient number of modulations across a width of a peak eluting from the first column to provide quantitative results and little reduction in first dimension chromatographic resolution for the modulator.

5. The multi-dimensional gas chromatograph of claim 4, wherein the sufficient number of modulations are configured to avoid wrap-around on a chromatogram.

6. The multi-dimensional gas chromatograph of claim 1, further comprising an injector configured to inject a sample into the first column.

7. The multi-dimensional gas chromatograph of claim 6, wherein the modulator is configured to sample the sample and inject the sample into the second column.

8. The multi-dimensional gas chromatograph of claim 7, further comprising a detector configured to receive and detect the sample.

9. A method for detecting and quantifying compounds in a sample during a single run using a multi-dimensional gas chromatograph having an injector, a first column, a second column and a modulator disposed between the first column and the second column, the method comprising:
   injecting a sample into the first column;
   passing at least a first portion of the sample into the modulator;
   modulating, by the modulator, the first portion of the sample at a first modulation period over a first period of time by:
      sampling the first portion of the sample; and
      injecting the first portion of the sample into the second column;
   detecting the first portion of the sample at a detector;
   passing a second portion of the sample into the modulator;
   modulating, by the modulator, the second portion of the sample with a second modulation period over a second period of time by:
      varying the second modulation period over the second time period;
      sampling the second portion of the sample; and
      injecting the second portion of the sample into the second column; and
   detecting the second portion of the sample at the detector.

10. The method of claim 9, wherein the second modulation period is longer than the first modulation period.

11. The method of claim 9, wherein the modulator is operating at a low duty cycle.

12. The method of claim 9, wherein at least one of the first modulation period or the second modulation period are configured to provide a sufficient number of modulations across a width of a peak eluting from the first column to provide quantitative results and little reduction in first dimension chromatographic resolution for the modulator.

13. The method of claim 12, wherein the sufficient number of modulations are configured to avoid wrap-around on a chromatogram.

14. The method of claim 12, wherein sampling the first portion of the sample and injecting the first portion of the sample into the second column occur multiple times over the first period of time.

15. The method of claim 12, wherein sampling the second portion of the sample and injecting the second portion of the sample into the second column occur multiple times over the second period of time.

16. A modulator for a multi-dimensional gas chromatograph for analyzing compounds in a sample during a single run, the modulator configured to perform a method comprising:
   modulating a first portion of a sample from a first column with at a first modulation period over a first period of time, including:
      sampling the first portion of the sample; and
      injecting the first portion of the sample into a second column; and
   modulating a second portion of the sample from the first column with a second modulation period by:
      varying the second modulation period over the second time period;
      sampling the second portion of the sample; and
      injecting the second portion of the sample into the second column.

17. The modulator of claim 16, wherein the modulator is disposed between the first column and the second column of the multi-dimensional gas chromatograph.

18. The modulator of claim 16, wherein the second modulation period is longer than the first modulation period.

19. The modulator of claim 16, wherein the modulator is operating at a low duty cycle.

20. The modulator of claim 16, wherein at least one of the first modulation period or the second modulation period are configured to provide a sufficient number of modulations across a width of a peak eluting from the first column to provide quantitative results and little reduction in first dimension chromatographic resolution for the modulator, and the sufficient number of modulations are configured to avoid wrap-around on a chromatogram.

* * * * *